US008994793B2

(12) United States Patent
Fukugawa et al.

(10) Patent No.: US 8,994,793 B2
(45) Date of Patent: Mar. 31, 2015

(54) IMAGE CAPTURE DEVICE, CONTROLLER AND COMPUTER PROGRAM

(71) Applicant: Panasonic Corporation, Osaka (JP)

(72) Inventors: Kohei Fukugawa, Osaka (JP); Shogo Sasaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 389 days.

(21) Appl. No.: 13/667,395

(22) Filed: Nov. 2, 2012

(65) Prior Publication Data

US 2013/0155201 A1 Jun. 20, 2013

(30) Foreign Application Priority Data

Nov. 7, 2011 (JP) .................. 2011-243305

(51) Int. Cl.
*H04N 13/02* (2006.01)

(52) U.S. Cl.
CPC ......... *H04N 13/025* (2013.01); *H04N 13/0239* (2013.01); *H04N 13/0296* (2013.01)
USPC .......................................................... 348/49

(58) Field of Classification Search
USPC .......................................................... 348/49
IPC ...................................................... H04N 13/02
See application file for complete search history.

(56) References Cited

U.S. PATENT DOCUMENTS

| 2003/0076407 | A1* | 4/2003 | Uchiyama et al. | 348/46 |
| 2008/0291311 | A1* | 11/2008 | Kusaka | 348/308 |
| 2011/0018970 | A1* | 1/2011 | Wakabayashi | 348/47 |
| 2012/0113278 | A1* | 5/2012 | Okada | 348/208.4 |

FOREIGN PATENT DOCUMENTS

| JP | 2006-093860 A | 4/2006 |
| JP | 2007-104586 A | 4/2007 |
| JP | 2010-204483 A | 9/2010 |
| JP | 2011-045039 A | 3/2011 |

* cited by examiner

*Primary Examiner* — Jay Au Patel
*Assistant Examiner* — Yulin Sun
(74) *Attorney, Agent, or Firm* — Renner, Otto, Boisselle & Sklar, LLP (57) ABSTRACT

A digital camera includes a first optical system including a first optical axis; a second optical system including a second optical axis which is different from the first optical axis; a first image sensor and a second image sensor for detecting subject images; and a controller for performing focus control on each optical system and for instructing each image sensor to execute shooting operation. The controller instructs the first image sensor and the second image sensor to execute shooting operation at a first timing when the focus operation for the first optical system is finished or a second timing when the focus operation for the second optical system is finished, which is later.

10 Claims, 8 Drawing Sheets

FIG.8

IMAGE CAPTURE DEVICE, CONTROLLER AND COMPUTER PROGRAM

BACKGROUND

1. Technical Field

This disclosure relates to focus control of a twin lens image capture device.

2. Description of the Related Art

A twin lens image capture device for shooting left and right images having a parallax by use of twin lens optical systems to record a three-dimensional (3D) image is known.

For example, Japanese Laid-Open Patent Publication No. 2011-45039 discloses a twin lens image capture device which can perform TELE/WIDE simultaneous shooting.

SUMMARY

This disclosure provides a twin lens image capture device capable of controlling the timing of various types of operations more preferably.

An image capture device according to the present disclosure includes a first optical system including a first focus lens located so as to move along a first optical axis; a second optical system including a second focus lens located so as to move along a second optical axis which is different from the first optical axis; at least one image sensor for detecting a subject image formed via the first optical system and the second optical system; and a controller for moving the first focus lens and the second focus lens to perform focus control on each of the first optical system and the second optical system and for instructing the at least one image sensor to execute shooting operation. The controller instructs the at least one image sensor to execute shooting operation at a first timing when the focus operation for the first optical system is finished or a second timing when the focus operation for the second optical system is finished, which is later.

According to an image capture device in this disclosure, a twin lens image capture device capable of controlling the timing of various types of operations more preferably can be provided.

DETAILED DESCRIPTION

Hereinafter, embodiments will be described with reference to the drawings when necessary. Detailed descriptions which are not necessary may not be provided. For example, well-known matter may not be described in detail, and substantially identical elements may not be described in repetition. This is for avoiding the following description from becoming unnecessarily redundant and for allowing a person of ordinary skill in the art to understand the following description more easily.

The present inventors provide the attached drawings and the following description so that a person of ordinary skill in the art will fully understand this disclosure, and do not intend to limit the subject matter of the claims to the attached drawings or the following description.

(Embodiment 1)

Hereinafter, the description will be given with reference to the drawings.

[1-1. Configuration of Digital Camera]

Figure 1:
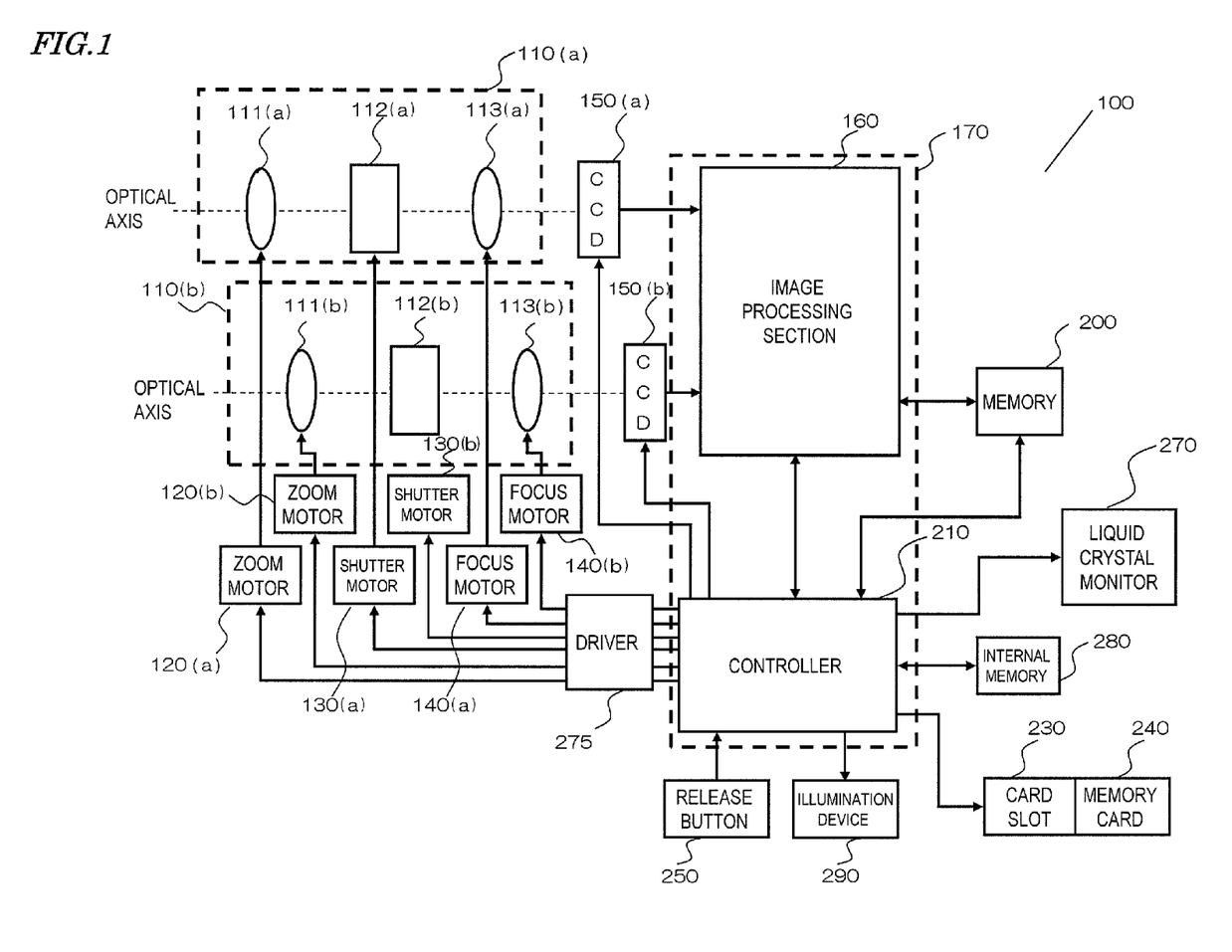
FIG. 1 is a block diagram showing a system configuration of a digital camera 100 in illustrative Embodiment 1.

FIG. 1 shows a system configuration of a digital camera 100 in this embodiment. The system configuration of the digital camera 100 will be described with reference to FIG. 1. The digital camera 100 includes optical systems 110($a$) and 110($b$), zoom motors 120($a$) and 120($b$), shutter motors 130($a$) and 130($b$) (hereinafter, referred to as the "diaphragm/lens shutter motors"), focus motors 140($a$) and 140($b$), CCD (Charge Coupled Device) image sensors 150($a$) and 150($b$), an image processing section 160, a memory 200, a controller 210, a driver 275, a card slot 230, a memory card 240, a release button 250, a liquid crystal monitor 270, an internal memory 280, and an illumination device 290.

The optical system 110($a$) includes a zoom lens 111($a$), a diaphragm/lens shutter 112($a$), and a focus lens 113($a$). The optical system 110($b$) includes a zoom lens 111($b$), a diaphragm/lens shutter 112($b$), and a focus lens 113($b$). The optical system 110($a$) forms an image of a subject for a first viewpoint. The optical system 110($b$) forms an image of the subject for a second viewpoint which is different from the first viewpoint. In this embodiment, the first viewpoint corresponds to a left eye, and the second viewpoint corresponds to a right eye. Hereinafter, the optical system 110($a$) may be referred to as a "left eye optical system 110($a$)", and the optical system 110($b$) may be referred to as a "right eye optical system 110($b$)".

The zoom lenses 111($a$) and 111($b$) respectively move along optical axes of the optical systems 110($a$) and 110($b$) and thus can enlarge or reduce the subject images formed on the CCD image sensors 150($a$) and 150($b$) (hereinafter, referred to as a "zoom operation") respectively. The zoom lenses 111($a$) and 111($b$) are respectively controlled by the zoom motors 120($a$) and 120($b$), and can respectively shoot images at different focal distances by use of the optical systems 110($a$) and 110($b$). The diaphragms/lens shutters 112($a$) and 112($b$) each include a lens shutter also acting as a diaphragm mechanism for adjusting the amount of light. The diaphragms/lens shutters 112($a$) and 112($b$) are respectively controlled by the diaphragm/lens shutter motors 130($a$) and 130($b$).

The focus lenses 113($a$) and 113($b$) are respectively located so as to move along the optical axes of the optical systems 110($a$) and 110($b$). The focus lenses 113($a$) and 113($b$) respectively focus the subject image for the first viewpoint and the subject image for the second viewpoint on the CCD image sensors 150($a$) and 150($b$).

During the zoom operation, the positions at which the subject images are formed are changed as the zoom lens 111($a$) and the zoom lens 111($b$) move. In order to compensate for this, the focus lenses 113($a$) and 113($b$) perform a tracking operation.

The focus lenses 113(a) and 113(b) are respectively controlled by the focus motors 140(a) and 140(b).

The optical systems 110(a) and 110(b) may be collectively referred to simply as the "optical system 110". The other elements may also be collectively referred to in a similar manner. Namely, the expressions such as the "zoom lenses 111", the "diaphragms/lens shutters 112", the "focus lenses 113", the "zoom motors 120", the "diaphragm/lens shutter motors 130", the "focus motors 140", and the "CCD image sensors 150" may be used.

The zoom motors 120(a) and 120(b) respectively control the driving of the zoom lenses 111(a) and 111(b). The zoom motors 120(a) and 120(b) are each, for example, a pulse motor, a DC motor, a linear motor, or a servo motor. The zoom motors 120(a) and 120(b) can drive the zoom lenses 111(a) and 111(b) via, for example, a cam mechanism or a ball screw mechanism. The zoom lens 111(a) and the zoom lens 111(b) may be operated by the same driving control. For example, the zoom lenses 111(a) and 111(b) can be controlled by use of a single zoom motor.

The diaphragm/lens shutter motors 130(a) and 130(b) respectively control the driving of the diaphragms/lens shutters 112(a) and 112(b). The diaphragm/lens shutter motors 130(a) and 130(b) are each, for example, a pulse motor, a DC motor, a linear motor, or a servo motor. The diaphragm/lens shutter motors 130(a) and 130(b) can drive the diaphragms/lens shutters 112(a) and 112(b) via, for example, a cam mechanism. The diaphragm/lens shutter 112(a) and the diaphragm/lens shutter 112(b) may be operated by the same driving control. For example, the diaphragms/lens shutters 112(a) and 112(b) can be controlled by use of a single diaphragm/lens shutter motor.

The focus motors 140(a) and 140(b) respectively control the driving of the focus lenses 113(a) and 113(b). The focus motors 140(a) and 140(b) can be each realized by, for example, a pulse motor, a DC motor, a linear motor, or a servo motor. The focus motors 140(a) and 140(b) can drive the focus lenses 113(a) and 113(b) via, for example, a cam mechanism or a ball screw mechanism.

The driver 275 generates an electrical signal for actually driving the zoom motors 120, the diaphragm/lens shutter motors 130 and the focus motors 140 in accordance with a driving signal transmitted from the controller 210.

The CCD image sensors 150(a) and 150(b) respectively detect the subject images formed by the optical systems 110(a) and 110(b) and thus respectively generate a first viewpoint signal and a second viewpoint signal. The CCD image sensors 150(a) and 150(b) perform, for example, exposure, transfer, and an operation of an electronic shutter.

The image processing section 160 performs various types of processing on the first viewpoint signal and the second viewpoint signal generated by the CCD image sensors 150(a) and 150(b). The various types of processing are, for example, gamma correction, white balance correction, and defect correction. The image processing section 160 generates data on an image to be displayed on the liquid crystal monitor 270 after the release button 250 is fully pressed (hereinafter, such an image will be referred to as a "review image") from the first viewpoint signal and the second viewpoint signal on which various types of processing have been performed, or generates an image signal to be stored on the memory card 240. The image processing section 160 also detects a contrast value based on image information which is periodically output from the CCD image sensors 150.

For processing a 3D image, the image processing section 160 performs a cut-out process on the first viewpoint signal and the second viewpoint signal. The 3D image is perceived by a user by an image of the first viewpoint signal and an image of the second viewpoint signal. When the image of the first viewpoint signal and the image of the second viewpoint signal which are obtained from the same subject are shifted in a vertical direction on a screen, the viewer feels something uncomfortable. The cut-out process can adjust the cut-out position in the vertical direction and thus can alleviate the uncomfortable feeling of the viewer.

The image processing section 160 compresses the first viewpoint signal and the second viewpoint signal on which various types of processing described above have been performed, in a compression format conformed to a prescribed file system standard. Compression signals obtained by compressing the first viewpoint signal and the second viewpoint signal are associated with each other and are recorded on the memory card 240.

The image processing section 160 can be realized by, for example, a DSP (Digital Signal Processor) or a microcontroller. The resolution (number of pixels) of a review image may be set to the resolution of the screen of the liquid crystal monitor 270 or to the resolution of image data compressed in a compression format conformed to the JPEG standard.

The memory 200 acts as a work memory of the image processing section 160 and the controller 210. The memory 200, for example, temporarily accumulates image signals processed by the image processing section 160 or image data input from the CCD image sensors 150 before being processed by the image processing section 160. The memory 200 also temporarily accumulates information on shooting conditions on the optical systems 110(a) and 110(b) and the CCD image sensors 150(a) and 150(b) at the time of shooting. The shooting conditions are, for example, distance to the subject, information on angle of view, ISO sensitivity, shutter speed, EV value, F value, inter-lens distance, shooting time, and OIS (Optical Image Stabilizer). The "OIS" is information on optical correction on an inadvertent shake of the user's hand which holds the camera. The memory 200 is, for example, a DRAM or a ferroelectric memory.

The internal memory 280 is, for example, a flash memory or a ferroelectric memory. The internal memory 280 stores, for example, a control program for controlling the entirety of the digital camera 100.

The controller 210 controls the entirety of the digital camera 100. The controller 210 may include only hardware, or may be realized by a combination of hardware and software. The controller 210 may be realized by a microcontroller or the like. The card slot 230 allows the memory card 240 to be inserted thereto or discharged therefrom. The card slot 230 is connectable to the memory card 240 mechanically and electrically.

The memory card 240 includes a flash memory, a ferroelectric memory or the like therein, and can store data.

The release button 250 is a two-step press-type operation button for accepting an operation from the user. When the user half-presses the release button 250, the controller 210 detects that the release button 250 has been half-pressed. When the user fully presses the release button 250, the controller 210 detects that the release button 250 has been fully pressed.

The liquid crystal monitor 270 is a display device which can provide a 2D display or a 3D display of the first viewpoint signal and the second viewpoint signal generated by the CCD image sensors 150 or the first viewpoint signal and the second viewpoint signal read from the memory card 240. The liquid crystal monitor 270 can display various types of setting information of the digital camera 100. For example, the liquid crystal monitor 270 can display the EV value, the F value, the shutter speed and the ISO sensitivity, which are shooting conditions at the time of shooting.

In this embodiment, the display device is the liquid crystal monitor 270, but the display device is not limited to this. The display device may be an organic EL display.

The illumination device 290 is a light source for illuminating the subject with light and thus assisting detection of the contrast value in an AF operation. The controller 210 controls whether or not to turn on the illumination device 290 in accordance with the illuminance, of the subject of shooting, which is determined by the image processing section 160.

In this embodiment, the controller 210 and the image processing section 160 are configured separately from each other, but the controller 210 and the image processing section 160 are not limited to having such a configuration. A chip 170 represented by the dashed line frame in FIG. 1 and including the controller 210 and the image processing section 160 may be mounted on the digital camera 100.

Figure 2:
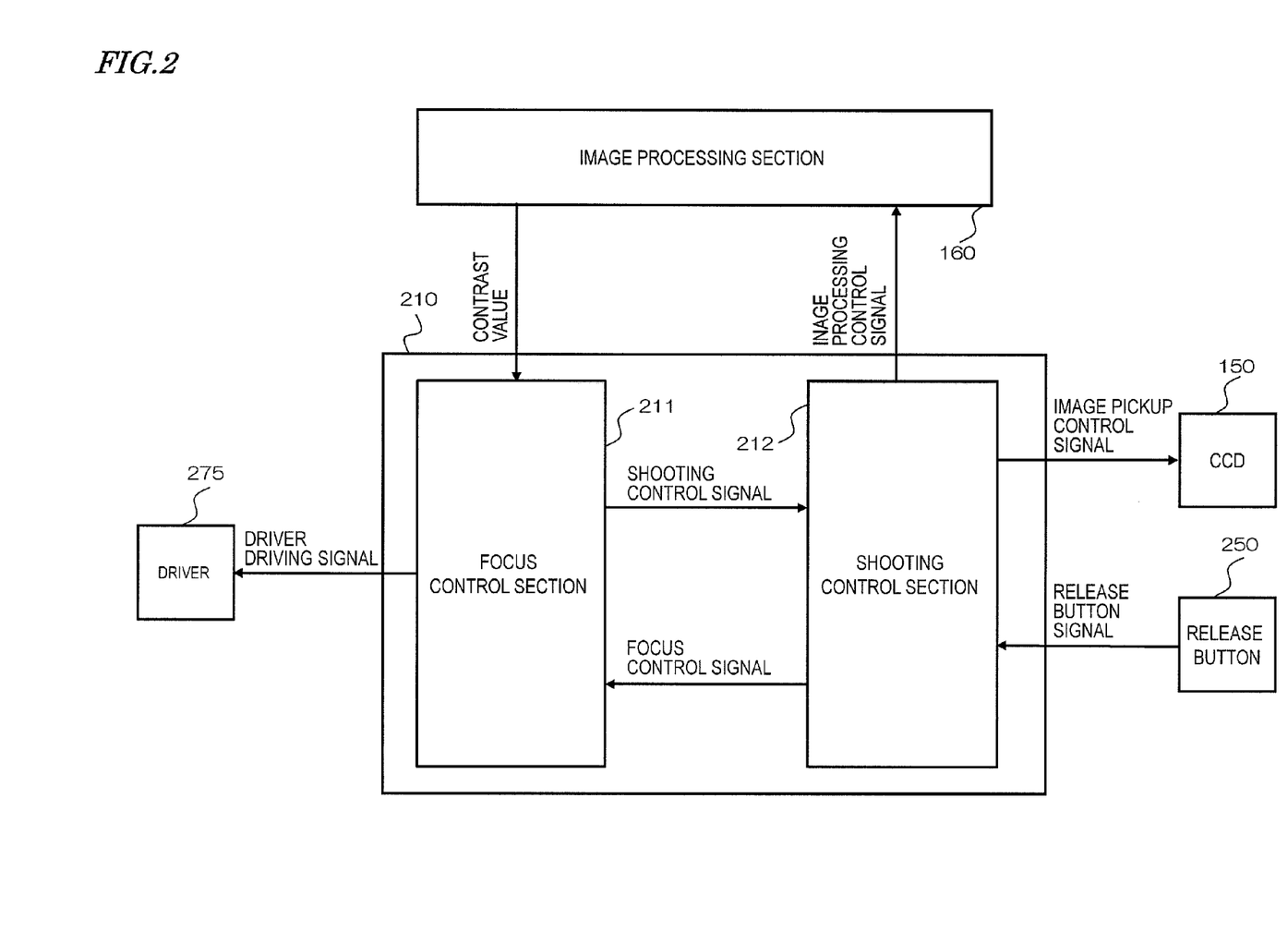
FIG. 2 shows functional blocks of a controller 210 in illustrative Embodiment 1.

With reference to FIG. 2, a configuration of the controller 210 will be described. FIG. 2 shows functional blocks of the controller 210. The controller 210 includes a focus control section 211 and a shooting control section 212. The focus control section 211 is electrically connected to the driver 275 and the image processing section 160. The focus control section 211 and the shooting control section 212 are electrically connected to each other in the controller 210. The focus control section 211 receives a contrast value from the image processing section 160 and controls the focus lenses 113 via the driver 275 in accordance with the contrast value. The focus control section 211 transmits a shooting control signal, indicating whether or not the current time is the timing to start shooting, to the shooting control section 212. The "shooting control signal" is a signal indicating, for example, whether or not focus operations of the focus lenses 113 for both eyes have been finished. The focus control section 211 controls the start of the focus operations of the focus lenses 113 in accordance with the focus control signal received from the shooting control section 212 described later. The focus control section 211 transmits a driver driving signal to the driver 275 and controls the focus operations of the focus lenses 113.

The shooting control section 212 is electrically connected to the CCD image sensors 150, the image processing section 160 and the release button 250. The shooting control section 212 receives a release button signal from the release button 250. The concept of "release button signal" encompasses a full-press release signal and a half-press release signal. The shooting control section 212 generates a focus control signal instructing the start of the focus operations based on the half-press release signal and transmits the focus control signal to the focus control section 211.

The shooting control section 212 transmits an image pickup control signal, indicating that the current time is the timing to capture, to the CCD image sensors 150 in accordance with the shooting control signal received from the focus control section 211 and the full-press release signal received from the release button 250, and also transmits an image processing control signal, indicating that the current time is the timing to start image processing, to the image processing section 160.

[1-2. Operation]

Figure 3:
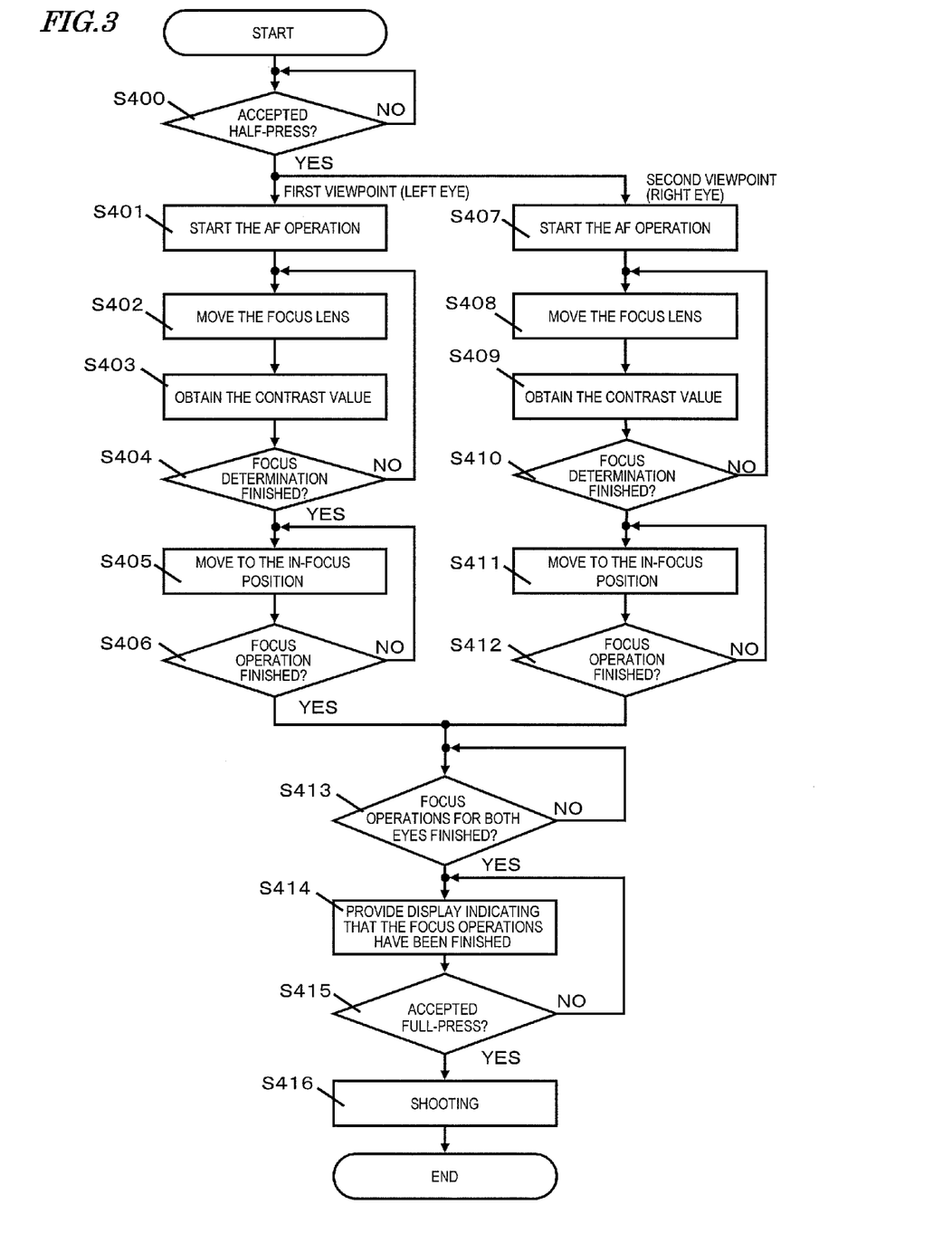
FIG. 3 is an operational flowchart of the digital camera 100 in illustrative Embodiment 1.

Hereinafter, with reference to FIG. 3 through FIG. 5, an operation of the digital camera 100 in this embodiment will be described. FIG. 3 shows an operational flow of the digital camera 100 in this embodiment.

At the time of start shown in FIG. 3, the digital camera 100 is in an power-ON state and thus can start shooting. The image processing section 160 starts generating a through-image based on image signals generated by the CCD image sensors 150. The "through-image" is an image generated by each of the CCD image sensors 150 at a prescribed frame rate when the digital camera 100 is in a state of being capable of start shooting, regardless of whether or not the release button 250 has been pressed. The controller 210 starts displaying the through-image on the liquid crystal monitor 270. As a result, the digital camera 100 is put into a shooting mode.

When the digital camera 100 is put into the shooting mode, the user can determine which of various shooting modes is to be adopted through a menu screen displayed on the liquid crystal monitor 270. Such various shooting modes include a 3D shooting mode, a 2D TELE/WIDE simultaneous shooting mode, and the like. In the 2D TELE/WIDE simultaneous shooting mode, the focal distances (zoom magnifications) of the left and right optical systems 110 can be adjusted independently from each other. Namely, the digital camera 100 can shoot images of different angles of view simultaneously via the left and right optical systems 110(a) and 110(b). In this mode, the focal distances of the optical systems 110 can be adjusted independently from each other, such that, for example, the focal distance of the left eye optical system 110(a) is 100 mm whereas the focal distance of the right eye optical system 110(b) is 25 mm. In this embodiment, the following description will be given with an assumption that the user has selected the 2D TELE/WIDE simultaneous shooting mode.

It is now assumed that the focal distances of the left and right optical systems 110 in the digital camera 100 are respectively set to be on the side of a telephoto end (e.g., focal distance: 100 mm) and on the side of a wide angle end (e.g., focal distance: 25 mm). Hereinafter, the side of the telescopic end will be referred to as the "TELE side", and the side of the wide angle end will be referred to as the "WIDE side". With such settings, in a focus search range for a zoom tracking operation expanding from a wide angle end to a telephoto end, the position of the focus lens 113(a) with respect to the corresponding optical axis is different from the position of the focus lens 113(b) with respect to the corresponding optical axis.

In the digital camera 100, aside from the above settings of the focal distances, the focal distances of the optical systems 110 can be adjusted independently from each other, such that, for example, the focal distance of the left eye optical system 110(a) is 25 mm (WIDE side) whereas the focal distance of the right eye optical system 110(b) is 100 mm (TELE side). There is no limitation on which of the left and right optical systems is to be used to shoot an image on the TELE side or an image on the WIDE side. Namely, in the 2D TELE/WIDE simultaneous shooting mode, an image on the TELE side can be shot via the left optical system and an image on the WIDE side can be shot via the right optical system, or an image on the WIDE side can be shot via the left optical system and an image on the TELE side can be shot via the right optical system.

When the digital camera 100 is put into the shooting mode, the controller 210 monitors a half-press operation by the user on the release button 250 (S400). When the user half-presses the release button 250, the controller 210 detects that the release button 250 has been half-pressed. Upon detecting the half-press operation on the release button 250, the controller 210 causes the focus lenses 113(a) and 113(b) to start AF operations (S401, S407). Steps S401 through S406 correspond to processing of the focus operation for the left eye optical system 110(a) for the first viewpoint, and steps S407 through S412 correspond to processing of the focus operation for the right eye optical system 110(b) for the second viewpoint.

In this embodiment, the digital camera 100 performs an AF operation by a contrast detection method. The "AF operation by the contrast detection method" is based on image information obtained by periodical image pickup performed by the CCD image sensors 150 on the subject images generated by the optical systems 110. More specifically, according to the AF operation by the contrast detection method, while the focus lenses 113 are moved in the focus search range expanding from the wide angle end to the telephoto end (hereinafter, such a movement will be referred to as a "search"), a change of the contrast value within a detection frame (focus frame) of the subject, which is the target of focus, is detected based on image information obtained periodically. The positions of the focus lenses 113 at which the contrast value is determined to be at a peak are determined as in-focus positions of the focus lenses 113.

The controller 210 causes the focus lens 113(a) for the first viewpoint (optical system 110(a)) and the focus lens 113(b) for the second viewpoint (optical system 110(b)) to start AF operations simultaneously (S401, S407). Hereinafter, the focus operations performed by the focus lens 113(a) for the first viewpoint and the focus lens 113(b) for the second viewpoint will be described sequentially.

First, the focus operation performed by the focus lens 113(a) for the first viewpoint will be described. For starting the AF operation (step S401), the controller 210 determines the position at which the focus lens 113(a) is to start searching. In the digital camera 100 in this embodiment, in accordance with the current position of the focus lens 113(a) in the focus search range expanding from the wide angle end to the telephoto end, the controller 210 determines whether the focus lens 113(a) is to make a search to the infinite position from the close position defined as the search start position, or to the close position from the infinite position defined as the search start position. More specifically, when the current position of the focus lens 113(a) is on the side of the close position with respect to the central position of the focus search range expanding from the wide angle end to the telephoto end, the controller 210 determines that the close position is the search start position. When the current position of the focus lens 113(a) is on the side of the infinite position with respect to the central position, the controller 210 determines that the infinite position is the search start position. In this example of the operation, the focal distance of the left optical system 111(a) in the digital camera 100 is set to be on the TELE side (focal distance: 100 mm). In this case, for example, when the current position of the focus lens 113(a) of the optical system 110(a) on the TELE side is on the side of the infinite position with respect to the central position in the focus search range, the controller 210 determines that the infinite position is the search start position. When the current position of the focus lens 113(a) of the optical system 110(a) is on the side of the close position with respect to the central position in the focus search range, the controller 210 determines that the close position is the search start position.

For starting the AF operation, the controller 210 changes the frame rate of image information which is output by the CCD image sensor 150(a) every second. For example, in the shooting mode, when controlling the CCD image sensor 150(a) to output a usual through-image, the controller 210 controls the CCD image sensor 150(a) to output the image information at 30 frames per second (referred to as the "frame rate for through-image display").

For starting the AF operation, the controller 210 controls the CCD image sensor 150(a) to output image information at 60 frames per second (referred to as the "AF frame rate"), which is higher than the frame rate at which the usual through-image is output. A reason for this is that when the frame rate is higher, the amount of information on the contrast value which can be obtained within a unit time is larger, and thus focus determination can be performed at higher speed.

When the focus lens 113(a) reaches the search start position, the controller 210 moves the focus lens 113(a) toward a search end position via the focus motor 140(a) (S402). At this point, the image processing section 160 detects the contrast value based on the image information which is periodically output from the CCD image sensor 150(a) at the AF frame rate. The image processing section 160 notifies the controller 210 of the detected contrast value at an interval of an AF frame period (inverse of the AF frame rate).

Alternatively, the image processing section 160 may notify the controller 210 of the detected contrast value at an interval of an integral multiple of the AF frame period. For example, the image processing section 160 notifies the controller 210 of the detected contrast value at an interval of two AF frame periods.

The controller 210 monitors the change of the contrast value which is periodically notified by the image processing section 160 while causing the focus lens 113(a) to make a search (S403).

When the notified contrast value is equal to or greater than a prescribed reference value and the contrast value which has been increased starts to be is decreased, the controller 210 determines that a peak of the contrast value has been detected. A state where the controller 210 has detected the peak of the contrast value is set as a state where the focus determination on the optical system 110(a) has been finished. The controller 210 monitors whether or not the focus determination on the optical system 110(a) has been finished (S404). Until the focus determination on the optical system 110(a) is finished, the controller 210 repeats the operations of steps S402 through S404.

When the peak of the contrast value is not detected although the focus lens 113(a) finishes searching in the focus search range, the controller 210 determines that the subject image is not focused. The controller 210 determines that the subject image is not focused and thus finishes the focus determination.

Upon determining that the focus determination on the optical system 110(a) has been finished (Yes in S404), the controller 210 defines the in-focus position of the focus lens 113(a) based on the peak position detected by the focus determination on the optical system 110(a), and moves the focus lens 113(a) to the in-focus position (S405). The controller 210 monitors whether or not the focus lens 113(a) has finished the focus operation. A state where the focus lens 113(a) has reached the in-focus position is set as a state where the focus operation for the optical system 110(a) has been finished. Until determining that the focus lens 113(a) has finished the focus operation, the controller 210 repeats the operations of steps S405 and S406.

When the controller 210 determines in step S404 that the subject image is not focused, the controller 210 moves the focus lens 113(a) to a prescribed out-of-focus position. For example, the infinite position is defined as the prescribed out-of-focus position in advance. When determining that the subject image is not focused, the controller 210 determines in step S406 that the focus operation has been finished, at the time when the focus lens 113(a) reaches the out-of-focus position.

Upon determining that the focus operation of the focus lens 113(a) has been finished, the controller 210 controls the CCD image sensor 150(a) to change the frame rate of the image information to be output by the CCD image sensor 150(a) from the higher AF frame rate to the lower frame rate for through-image display. The higher the output frame rate is, the larger the power consumption is. Therefore, from the point of view of power savings, the frame rate may be changed from the AF frame rate to the frame rate for through-image display at the time when it can be determined that the focus determination has been finished in step S404, instead of the time when the focus operation is finished in step S406. What should be noted, however, is that the controller 210 determines whether or not the focus lens 113(a) has reached the in-focus position based on the contrast value detected when the peak of the contrast value was determined to be detected. Therefore, the AF operation can be finished at higher speed in the case where the AF frame rate, at which a larger amount of information is obtained per unit time, is used until the focus operation is finished.

Upon determining that the focus operation of the focus lens 113(a) has been finished (Yes in step S406), the controller 210 advances the processing to step S413.

Now, the focus operation performed by the focus lens 113(b) for the second viewpoint will be described. For starting the AF operation in step S407, the controller 210 determines the position at which the focus lens 113(b) is to start searching. The method of determination is substantially the same as that for the focus lens 113(a) for the first viewpoint described above and thus will not be further described. For starting the AF operation, the controller 210 changes the frame rate of image information which is output by the CCD image sensor 150(b) every second. The method of change is substantially the same as that for the focus lens 113(a) for the first viewpoint described above and thus will not be further described.

When the focus lens 113(b) reaches the search start position, the controller 210 moves the focus lens 113(b) toward a search end position (S408), obtains the detected contrast value (S409), determines whether or not the focus determination has been finished (S410), moves the focus lens 113(b) to the in-focus position based on the determined peak (S411), and determines whether or not the focus operation has been finished (S412). The operations of steps S408 through S412 are substantially the same as those of steps S402 through S416 for the focus lens 113(a) for the first viewpoint described above and thus will not be further described. When the focus operation is finished, the frame rate is changed from the AF frame rate to the frame rate for through-image display, which is also substantially the same as that for the focus lens 113(a) for the first viewpoint described above and thus will not be further described.

Upon determining that the focus operation of the focus lens 113(b) has been finished (Yes in step S412), the controller 210 advances the processing to step S413.

The controller 210 determines whether or not both of the focus lens 113(a) for the first viewpoint and the focus lens 113(b) for the second viewpoint have finished the focus operations (S413). When either one of the focus lens 113(a) for the first viewpoint and the focus lens 113(b) for the second viewpoint has not finished the focus operation (No in S413), the controller 210 continues monitoring until both of the focus lenses 113 finish the focus operations.

Upon determining that both of the focus lenses 113 have finished the focus operations (Yes in S413), the controller 210 provide a display indicating that the focus operations have been finished on the liquid crystal monitor 270. Namely, at the timing when the focus operation of the focus lens 113(a) for the first viewpoint has been finished or the timing when the focus operation of the focus lens 113(b) for the second viewpoint has been finished, which is later, the controller 210 provides a display indicating that the focus operations have been finished on the liquid crystal monitor 270. Owing to this, the user can easily learn that the focus operations for both of the left eye and the right eye have been finished and an image having a good focus state can now be shot. The form of display on the liquid crystal monitor 270 indicating that the focus operations have been finished may be lighting of an indicator showing the finish of the focus operations; change of a specific form of display (color, shape, size, etc.) of the focus frame displayed on the screen; or an icon, an illustration or a language which explicitly indicates that the shooting is now possible. Alternatively, it can be indicated that the focus operations have been finished by displaying exposure information which is a shooting condition that is currently set.

Next, the controller 210 determines whether or not a full-press operation by the user on the release button 250 has been accepted (S415). After it is determined Yes in step S400, the controller 210 always monitors whether or not the release button 250 has been fully pressed. When the controller 210 has not accepted a full-press operation (No in S415), the controller 210 repeats the operations of steps S414 and S415 and waits for a full-press operation while maintaining the in-focus positions of the focus lenses 113. When the controller 210 accepts a full-press operation after accepting the half-press operation on the release button 250 in step S400 until determining whether or not a full-press operation on the release button 250 has been accepted in step S415 (Yes in S415), the controller 210 instructs the CCD image sensors 150 and the image processing section 160 to execute processing for shooting (hereinafter, referred to as a "shooting operation") (S416).

Hereinafter, examples of timing when the full-press operation on the release button 250 is accepted in step S415 will be described. After determining Yes in step S400, the controller 210 always monitors whether or not the release button 250 has been fully pressed.

It is now assumed that the controller 210 accepts a full-press operation on the release button 250 before the focus operations for both eyes are finished in step S413. In this case, at the timing when the focus operations for both eyes are finished in step S413, namely, at the timing when the focus operation of the focus lens 113(a) for the first viewpoint or at the timing when the focus operation of the focus lens 113(b) for the second viewpoint, which is later, the controller 210 causes the CCD image sensors 150 to detect subject images and instructs the image processing section 160 to execute a shooting operation.

Alternatively, it is now assumed that the controller 210 accepts a full-press operation on the release button 250 when or after the focus operations for both eyes are finished in step S413. In this case, at the timing when the full-press operation on the release button 250 is accepted, the controller 210 causes the CCD image sensors 150 to detect subject images and instructs the image processing section 160 to execute a shooting operation.

Which of the focus lens 113(a) for the first viewpoint and the focus lens 113(b) for the second viewpoint first finishes the focus determination operation, or first finishes the focus operation, depends on the contrast state in the focus frame. In the case of the TELE/WIDE simultaneous shooting, the stroke length by which the focus lenses 113 are moved to the in-focus positions are different between the TELE side and the WIDE side. The "stroke length" is the length by which each focus lens 113 is moved from the close position toward the infinite position in the case where the search start position is the close position, and is the length by which each focus lens 113 is moved from the infinite position toward the close position in the case where the search start position is the infinite position. Since the stroke length on the WIDE side is shorter than the stroke length on the TELE side, the focus determination or the focus operation on the WIDE side is usually finished first. Therefore, there is a time lag between the time when the focus determination regarding one eye is finished and the time when the focus determination regarding the other eye is finished, or between the time when the focus operation for one eye is finished and the time when the focus operation for the other eye is finished. Especially in the case of the TELE/WIDE simultaneous shooting, this time lag is bodily sensed as being conspicuous. The focus operation on the WIDE side is finished, and, for example, several hundred milliseconds after the finish, the focus operation on the TELE side is finished.

The present inventors found that the following problems occur when focus control is performed in a twin lens image capture device.

It is assumed that the shooting operation is executed at the timing when the focus operation for each of the left eye and the right eye is finished, instead of at the timing when the focus operations for both of the left eye and the right eye are finished. In this case, when the shooting operation on the WIDE side for which the focus operation is first finished is executed, the user recognizes that the shooting operation on the TELE side for which the focus operation has not been finished has also been executed. As a result, the user may undesirably misunderstand that the shooting operations for both eyes have been finished.

In the case where the user misunderstands that the shooting operations for both eyes have been finished although the focus operation on the TELE side has not been finished, the user may undesirably change his/her posture that he/she has kept still while holding the housing of the digital camera 100 for shooting. When this occurs, the blur component due to a camera shake significantly influences the shot image due to the action of changing the posture because the focus operation on the TELE side has not been finished.

According to the digital camera 100 in this embodiment, the shooting operation is executed at one of the timings when the focus operations are finished, which is later (in the case where the full-press operation on the release button 250 has been accepted). Therefore, the user does not change his/her posture when the focus operations for both eyes have not been finished. As a result, the shot image can be avoided from being influenced by the blur component due to the camera shake.

The present inventors also found the following problems.

It is assumed that in the case where a full-press operation on the release button 250 is not accepted at any point during the steps S400 through S415, the liquid crystal monitor 270 provides a display indicating that the focus operations have been finished. In the case where the display indicating that the focus operations have been finished is provided although the focus operation of the focus lens for only one of the eyes has been finished, the user fully presses the release button 250. As a result, the shooting operation is executed although the focus operation of the focus lens for the other eye has not been finished. Therefore, an image in a good focus state is not likely to be obtained.

In the digital camera 100 in this embodiment, the liquid crystal monitor 270 provides the display indicating that the focus operations have been finished at one of the timings when the focus operations are finished, which is later. Therefore, the user can shoot an image in a good focus state with more certainty.

Now, with reference to FIG. 4 and FIG. 5, the operation of the digital camera 100 will be described mainly regarding the timings when various types of operations are started and finished.

Figure 4:
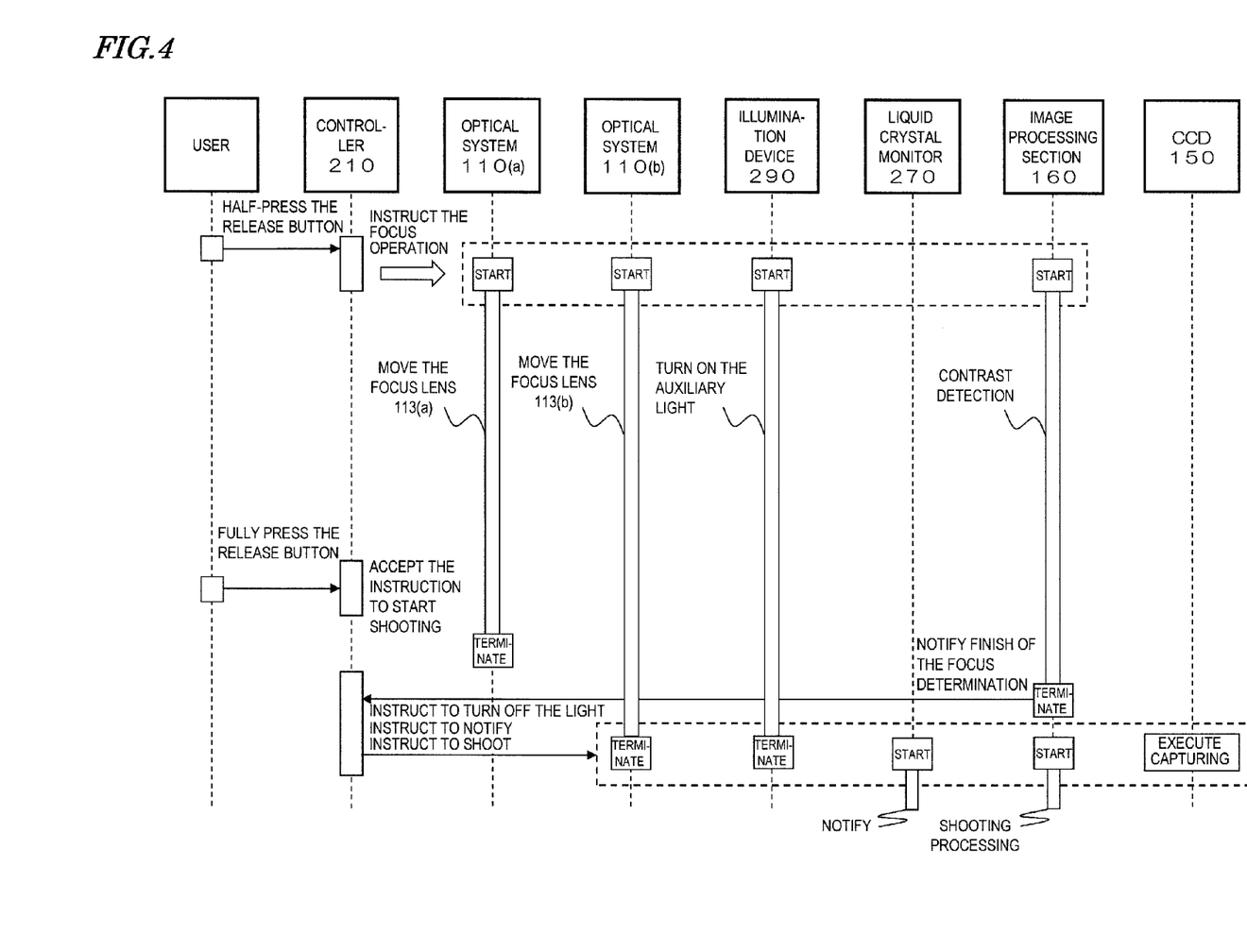
FIG. 4 shows the timing of shooting in the case where a release button 250 is fully pressed before AF operations are finished in the digital camera 100 in illustrative Embodiment 1.

FIG. 4 shows the timing of shooting in the case where the release button 250 is fully pressed before the AF operations are finished in the digital camera 100 in Embodiment 1.

When the user half-presses the release button 250, the controller 210 controls each of the focus lenses 113 to start the focus operation at the timing when the controller 210 accepts the half-press operation on the release button 250.

In the example of timing of shooting shown in FIG. 4, the focus operation for the optical system 110(a) is finished before the focus operation for the optical system 110(b).

At the timing when the controller 210 accepts the half-press on the release button 250, the illumination device 290 starts turning on AF auxiliary light and the image processing section 160 starts detecting the contrast value in the AF operation, both under the control by the controller 210. Namely, at the timing when the controller 210 accepts the half-press on the release button 250, the digital camera 100 starts the focus operation.

Whether or not to cause the illumination device 290 to turn on the AF auxiliary light is determined by comparing the illuminance of the image for the first viewpoint or the image for the second viewpoint with a prescribed illuminance reference value. The illuminance reference value is stored on the internal memory 280 in advance. The controller 210 determines which of the image for the first viewpoint and the image for the second viewpoint has a lower illuminance. When the illuminance of the image determined to have a lower illuminance is lower than the illuminance reference value, the controller 210 causes the illumination device 290 to turn on the AF auxiliary light.

When, as shown in FIG. 4, the user fully presses the release button 250 before the focus operations for the optical systems 110 are finished, the controller 210 accepts the full-press on the release button 250. In this case, at the timing when the focus operation for the optical system 110(b) is finished, the illumination device 290 turns off the AF auxiliary light, the CCD image sensors 150 execute capturing, the image processing section 160 starts the shooting operation, and the display monitor 270 shows the display indicating that the focus operations have been finished, all under the control by the controller 210.

The timing when the illumination device 290 turns off the AF auxiliary light, the timing when the CCD image sensors 150 are caused to execute capturing, the timing when the image processing section 160 starts the shooting operation, and the timing when the display monitor 270 provides the display indicating that the focus operations have been finished are synchronized with the timing when the focus operation for the optical system 110(b) is finished. Namely, at the timing when the focus operation for the optical system 110(b) is finished, the digital camera 100 starts the shooting operation.

At this timing, the release button 250 has already been fully pressed. Therefore, the controller 210 may control the display monitor 270 so as not to provide the display indicating that the focus operations have been finished in synchronization with the timing when the focus operation for the optical system 110(b) is finished.

Figure 5:
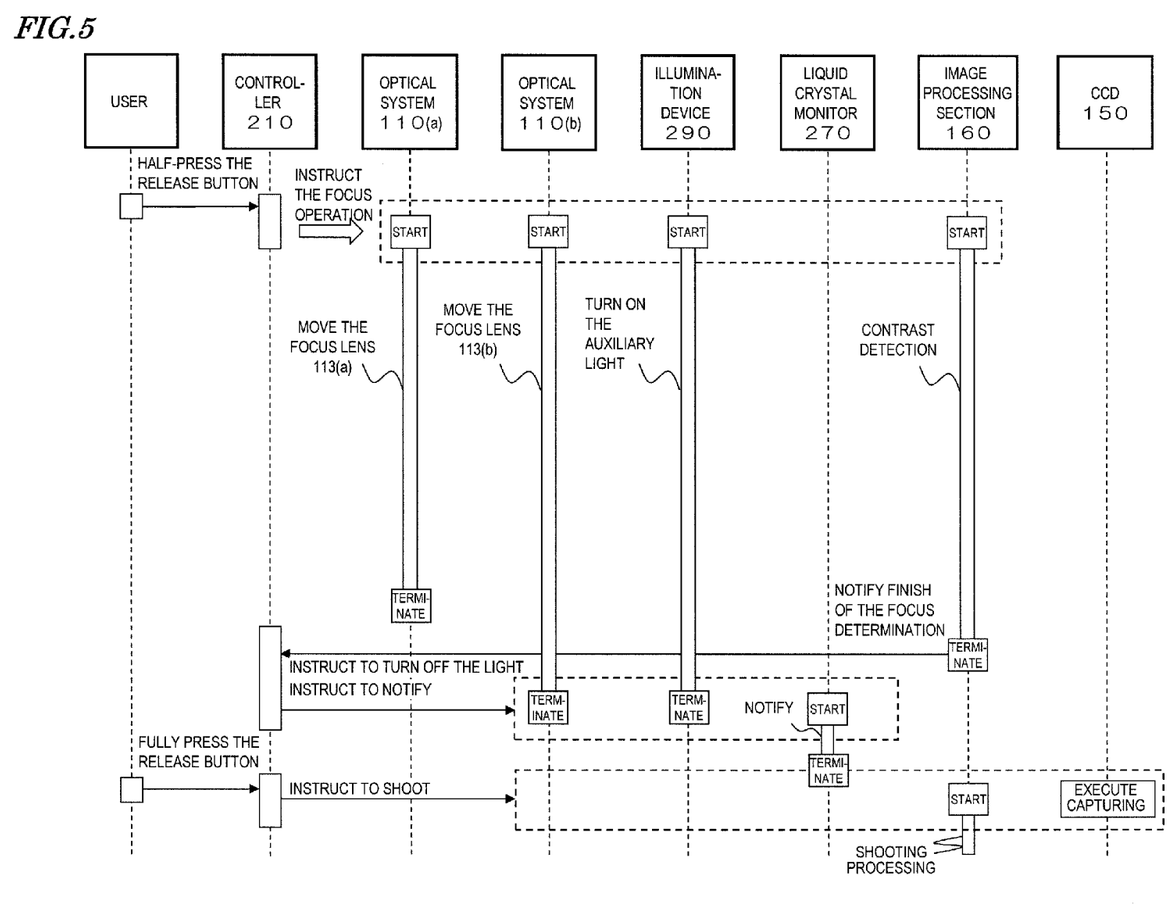
FIG. 5 shows the timing of shooting in the case where the release button 250 is fully pressed after the AF operations are finished in the digital camera 100 in illustrative Embodiment 1.

FIG. 5 shows the timing of shooting in the case where the release button 250 is fully pressed after the AF operations are finished in the digital camera 100 in Embodiment 1.

The control to start the focus operations when the Controller 210 accepts a half-press operation on the release button 250 is substantially the same as that described above regarding the timing of shooting shown in FIG. 4 and will not be described again.

In the example of timing shown in FIG. 5 also, the focus operation for the optical system 110(a) is finished before the focus operation for the optical system 110(b).

When, as shown in FIG. 5, the user fully presses the release button 250 after the focus operations for the optical systems 110 are finished, the controller 210 accepts the full-press on the release button 250. In this case, at the timing when the focus operation for the optical system 110(b) is finished, the illumination device 290 turns off the AF auxiliary light and the liquid crystal monitor 270 shows the display indicating that the focus operations have been finished, both under the control by the controller 210. At the timing when the full-press on the release button 205 is accepted (timing when the user fully presses the release button 250), the CCD image sensors 150 execute capturing and the image processing section 160 starts the shooting operation, both under the control by the controller 210.

The timing when the illumination device 290 turns off the AF auxiliary light and the timing when the display monitor 270 provides the display indicating that the focus operations have been finished are synchronized with the timing when the focus operation for the optical system 110(b) is finished. The timing when the CCD image sensors 150 are caused to execute capturing and the timing when the image processing section 160 starts the shooting operation are synchronized with the timing when the user fully presses the release button 250. Namely, at the timing when the user fully presses the release button 250, the digital camera 100 starts the shooting operation.

The above-described digital camera 100 includes the CCD image sensors 150(a) and 150(b). The configuration of the digital camera 100 is not limited to this.

Figure 6:
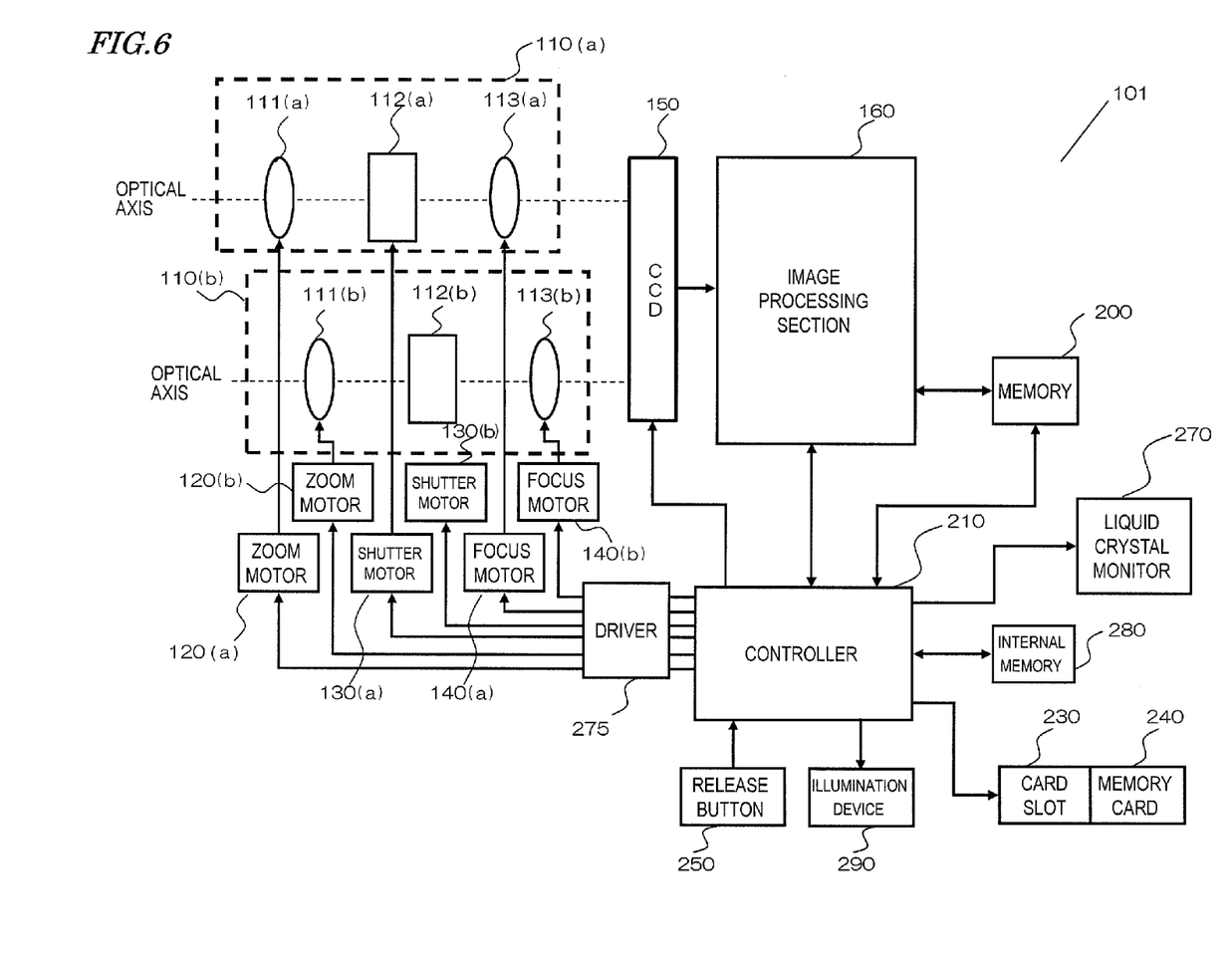
FIG. 6 is a block diagram showing a system configuration of a digital camera 101 including a single image sensor in a modification of illustrative Embodiment 1.

FIG. 6 shows a system configuration of a digital camera 101 including a single image sensor. The digital camera 101 includes a single image sensor for optical systems for both eyes.

The CCD image sensor 150 includes a first image area and a second image area. The optical system 110(a) for the first viewpoint forms a first subject image on the first image area, and the optical system 110(b) for the second viewpoint forms a second subject image on the second image area. In this manner, the subject image for the first viewpoint and the subject image for the second viewpoint can be detected by a single image sensor instead of a plurality of image sensors.

The processing described above with reference to FIG. 3 through FIG. 5 can be realized by an execution procedure of a computer program executable by the controller 210. Such a computer program is recorded on a storage medium such as a CD-ROM or the like and distributed in the market as a product or is transmitted by an electric communication line such as the Internet or the like. The controller 210 of the digital camera 100 is realized by a general-purpose processor (semiconductor circuit) capable of executing such a computer program, or is realized as a dedicated processor having such a computer program and the controller 210 integrated together.

[1-3. Effects]

As described above, this embodiment is as follows.

(1) The digital camera 100 includes the optical system 110(a) including the focus lens 113(a) located so as to move along a first optical axis, the optical system 110(b) including the focus lens 113(b) located so as to move along a second optical axis which is different from the first optical axis, the CCD image sensor 150(a) and the CCD image sensor 150(b) respectively for detecting subject images formed via the optical system 110(a) and the optical system 110(b), and the controller 210 for moving the focus lens 113(a) and the focus lens 113(b) to perform focus control on each of the optical system 110(a) and the optical system 110(b) and also for instructing each of the CCD image sensor 150(a) and the CCD image sensor 150(b) to execute shooting operation.

The controller 210 instructs each of the CCD image sensor 150(a) and the CCD image sensor 150(b) to execute shooting operation at the first timing when the focus operation for the optical system 110(a) is finished or at the second timing when the focus operation for the optical system 110(b) is finished, which is later.

Owing to this, in a twin lens camera, shooting can be performed at the timing when the focus operations for both eyes are finished.

(2) The digital camera 100 in (1) further includes the release button 250 for accepting an instruction by the user to start shooting, in the case where the release button 250 accepts an instruction to start shooting before the focus operation for the optical system 110(a) and the focus operation for the optical system 110(b) are finished, the controller 210 instructs each of the CCD image sensor 150(a) and the CCD image sensor 150(b) to execute shooting operation at the first timing when the focus operation for the optical system 110(a) is finished or at the second timing when the focus operation for the optical system 110(b) is finished, which is later.

Owing to this, in a twin lens camera, even in the case where an instruction by the user to start shooting is accepted before the focus operations for both eyes are finished, shooting can be performed at the timing when the focus operations for both eyes are finished.

(3) The digital camera 100 in (1) further includes the liquid crystal monitor 270 for indicating that the focus operation for the optical system 110(a) and the focus operation for the optical system 110(b) have been finished at the first timing or the second timing which is later.

Owing to this, in a twin lens camera, at the timing when the focus operations for both eyes are finished, information can be notified to the user that the focus operations have been finished. Thus, the user can easily determine at which timing the release button 250 is to be fully pressed to issue an instruction to start shooting.

(4) The digital camera 100 in (1) further includes the illumination device 290 for emitting auxiliary light for assisting the focus operation for the optical system 110(a) and the focus operation for the optical system 110(b).

After turning on the illumination device 290, the controller 210 turns off the illumination device 290 at the first timing or the second timing which is later.

Owing to this, in a twin lens camera, the illumination device 290 can be turned on with certainty while the AF auxiliary light is needed for the focus operations.

(5) In the digital camera 100 in (1), an angle of view of a first image obtained via the optical system 110(a) is different from an angle of view of a second image obtained via the optical system 110(b).

Owing to this, in a twin lens camera, TELE/WIDE simultaneous shooting can be realized.

(Embodiment 2)

Hereinafter, the description will be given with reference to FIG. 7.

[2-1. Configuration of Digital Camera]

Figure 7:
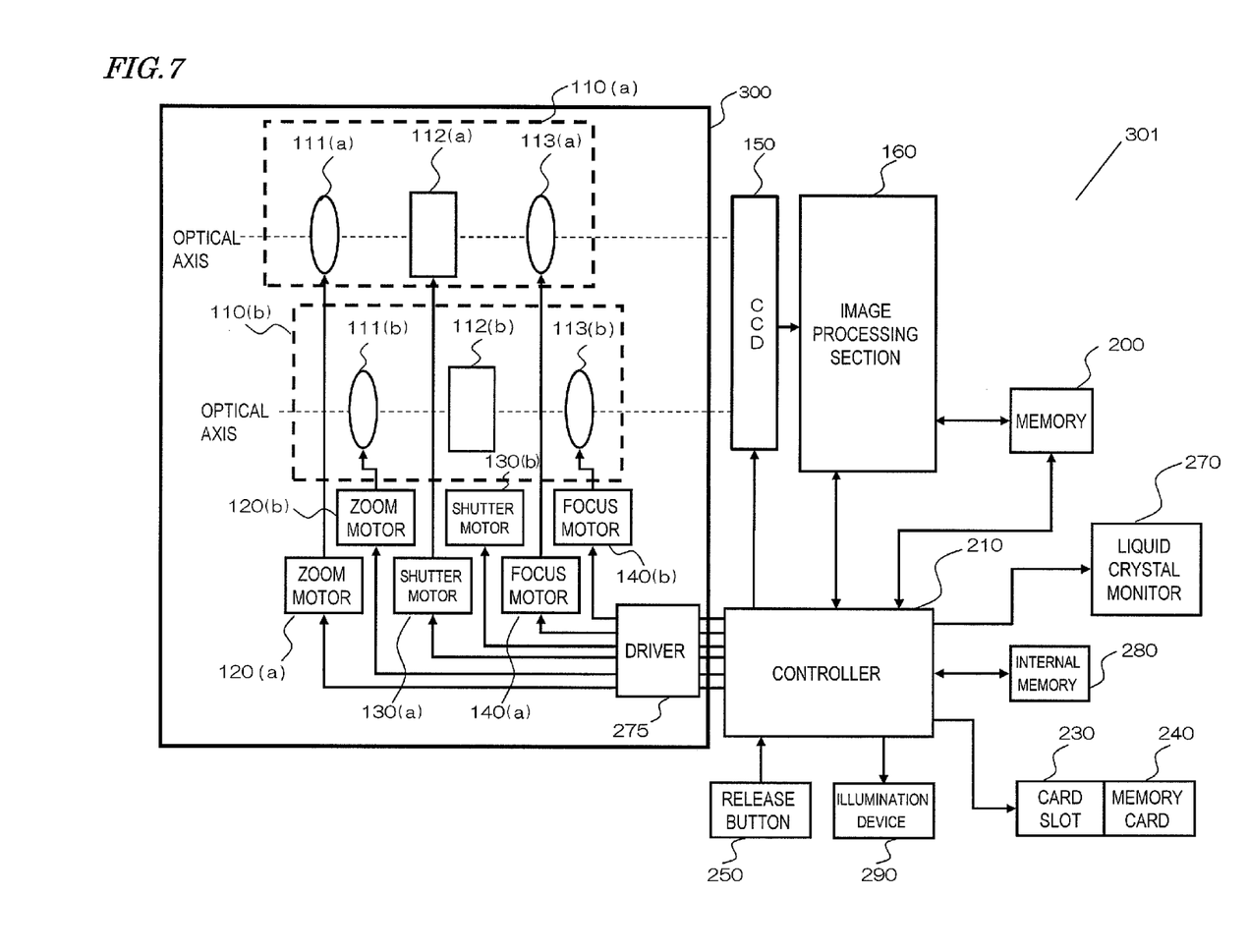
FIG. 7 is a block diagram showing a system configuration of a digital camera 301 in illustrative Embodiment 2.

FIG. 7 shows a system configuration of a digital camera 301 in this embodiment. A thick-lined frame shown in FIG. 7 represents a lens unit 300 including the optical systems 110, various types of lens driving motors (120, 130 and 140), and the driver 275. The digital camera 301 in this embodiment allows the lens unit 300 to be attached thereto or detached therefrom. The digital camera 301 is, for example, a single-lens reflex digital camera to which or from which the lenses are attachable or detachable via a lens mount.

When the lens unit 300 is attached to the digital camera 301 in this embodiment, the driver 275 in the lens unit 300 and the controller 210 in the digital camera 301 are electrically connected to each other. Therefore, the controller 210 can control the driver 275 in the lens unit 300. Namely, the controller 210 can control the focus operations of the focus lenses 113 in the lens unit 300 via the driver 275. In this embodiment, the image sensor is not limited to a single CCD image sensor 150. As described in Embodiment 1, a plurality of CCD image sensors may be used.

[2-2. Operation]

The operation of the digital camera 301 in this embodiment is the same as that of the digital camera 100 in Embodiment 1 described above, and thus will not be described again.

[2-3. Effects]

As described above, in this embodiment, the digital camera 301 allows the lens unit 300 to be attached thereto, or detached therefrom. The lens unit 300 includes the optical system 110(*a*) including the focus lens 113(*a*) located so as to move along the first optical axis and the optical system 110(*b*) including the focus lens 113(*b*) located so as to move along the second optical axis which is different from the first optical axis. The digital camera 301 includes the CCD image sensor 150 for detecting subject image formed via the optical system 110(*a*) and the optical system 110(*b*), and the controller 210 for moving the focus lens 113(*a*) and the focus lens 113(*b*) to perform focus control on each of the optical system 110(*a*) and the optical system 110(*b*) and also instructing the CCD image sensor 150 to execute shooting operation.

The controller 210 instructs the CCD image sensor 150 to execute shooting operation at a first timing when the focus operation for the optical system 110(*a*) is finished or a second timing when the focus operation for the optical system 110(*b*) is finished, which is later.

Owing to this, in a two lens camera allowing a lens unit to be attached thereto or detached therefrom, shooting can be performed at the timing when the focus operations for both eyes are finished.

(Embodiment 3)

The following description will be given with reference to FIG. 8.

[3-1. Configuration of Controller]

Figure 8:
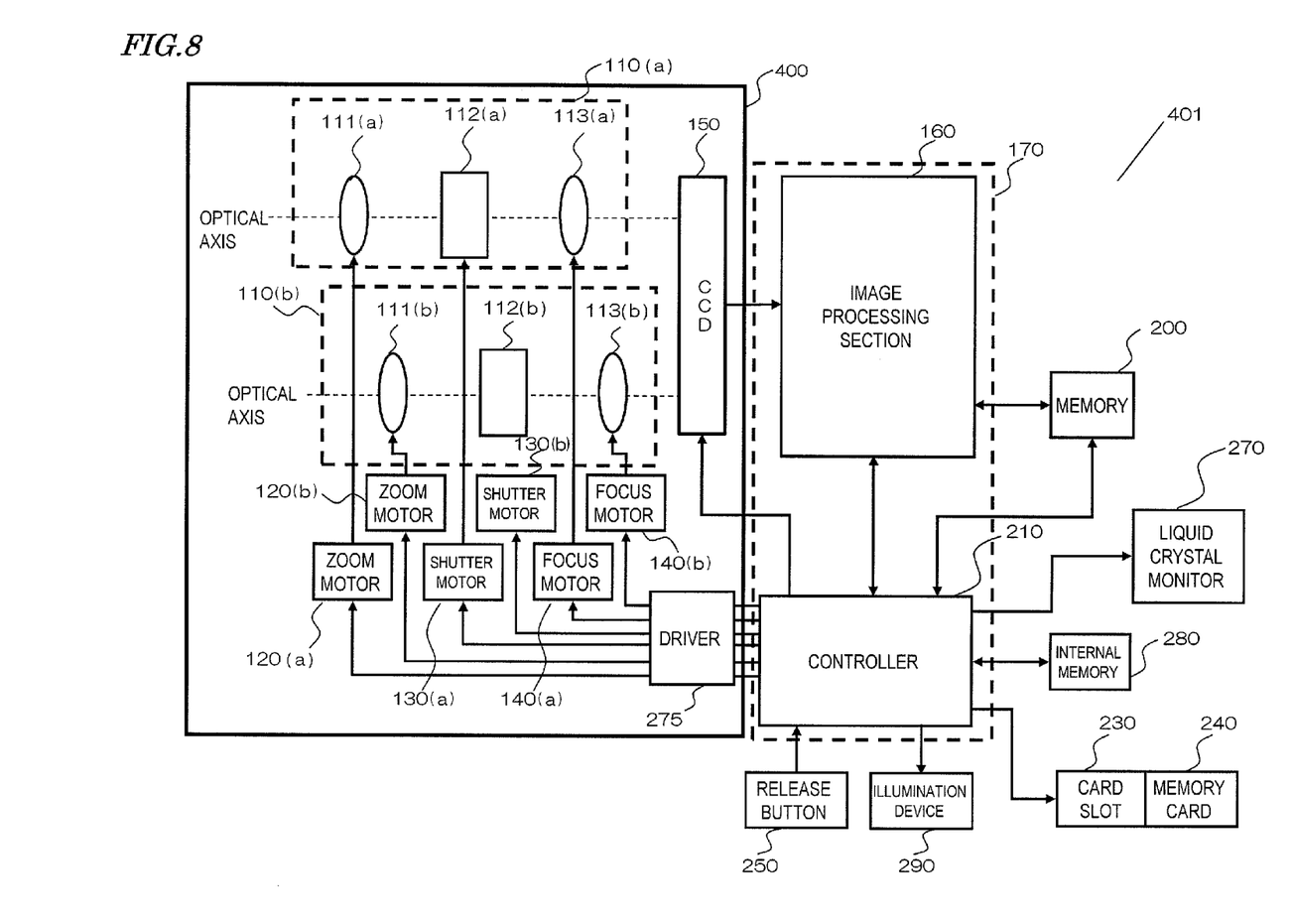
FIG. 8 is a block diagram showing a system configuration of a camera system 401 in illustrative Embodiment 3.

FIG. 8 shows a system configuration of a camera system 401 in this embodiment including the controller 210 for controlling a lens unit 400 including an image sensor.

A thick-lined frame shown in FIG. 8 represents a lens unit 400 including the optical systems 110, various types of lens driving motors (120, 130 and 140), the driver 275, and the CCD image sensor 150. The lens unit 400 is, for example, a CCD image sensor module including the CCD image sensor and the lenses integrated together. The lens unit 400 is connectable to the camera system 401.

The camera system 401 includes the controller 210 and the image processing section 160 for performing various types of processing. The controller 210 controls the lens unit 400 including the CCD image sensor 150. As described in Embodiment 1, the controller 210 in the camera system 401 includes the focus control section 211 and the shooting control section 212 shown in FIG. 2. When the lens unit 400 is connected to the camera system 401, the driver 275 in the lens unit 400 and the controller 210 in the camera system 401 are electrically connected to each other. The CCD image sensor 150 in the lens unit 400 and the image processing section 160 in the camera system 401 are also electrically connected to each other. Therefore, the controller 210 can control the focus operations of the focus lenses 113 via the driver 275 in the lens unit 400. The image processing section 160 can receive an electrical signal on image information which is output from the CCD image sensor 150 and can perform various types of processing on the electrical signal.

In this embodiment, the controller 210 and the image processing section 160 are configured separately from each other. Alternatively, as described in Embodiment 1, the controller 210 and the image processing section 160 may be mounted on the camera system 401 as one chip. In this embodiment, the image sensor in the lens unit 400 is not limited to a single CCD image sensor. As described in Embodiment 1, a plurality of CCD image sensors may be used.

[3-2. Operation]

The entire operation of the camera system 401 in this embodiment is the same as that of the digital camera 100 described above in Embodiment 1, and thus will not be described again.

The operation of the controller 210 in the camera system 401 in this embodiment is the same as that of the controller 210 in the digital camera 100 described above in Embodiment 1, and thus will not be described again.

[3-3. Effects]

As described above, in this embodiment, the camera system 401 includes the controller 210 for controlling the lens unit 400, which includes the optical system 110(*a*) including the focus lens 113(*a*) located so as to move along the first optical axis, the optical system 110(*b*) including the focus lens 113(*b*) located so as to move along the second optical axis which is different from the first optical axis, and the CCD image sensor 150 for detecting subject image formed via the optical system 110(*a*) and the optical system 110(*b*). The controller 210 includes the focus control section 211 for moving the focus lens 113(*a*) and the focus lens 113(*b*) to perform focus control on each of the optical system 110(*a*) and the optical system 110(*b*), and the shooting control section 212 for instructing the CCD image sensor 150 to execute shooting operation.

The controller 210 instructs the CCD image sensor 150 to execute shooting operation at the first timing when the focus operation for the optical system 110(*a*) is finished or the second timing when the focus operation for the optical system 110(*b*) is finished, which is later.

Owing to this, in a camera system to which an image sensor module is connectable, shooting can be performed at the timing when the focus operations for both eyes are finished.

(Other Embodiments)

As described above, Embodiments 1 through 3 have been described as examples of technology disclosed in this application. However, the technology in this disclosure is not limited to these, and is applicable to embodiments with appropriate changes, replacements, additions, deletions or the like. Elements in Embodiments 1 through 3 may be combined to provide another embodiment.

Hereinafter, such other embodiments will be described.

In Embodiments 1 through 3 described above, the image pickup element is a CCD image sensor. Alternatively, the image pickup element may be a MOS sensor or any other image pickup element.

In Embodiment 1 described above, the TELE/WIDE simultaneous shooting is performed by the twin lens image capture device. This disclosure is not limited to this.

Namely, the technology in this disclosure is applicable to 3D shooting performed by a twin lens image capture device. Especially in the case of 3D shooting, left and right images synchronized to each other are needed. Therefore, it is important to synchronize the shooting timings for both eyes. However, there is a certain level of lag between left and right focus lenses and control operations thereon due to individual difference. For this reason, there may be a case where even though the focus operation by one of the focus lenses has been finished, the focus operation by the other focus lens has not been finished due to such a lag.

According to this disclosure, the image sensor executes the shooting operation after the focus operations performed by the focus lenses for the left and right optical systems are finished. Therefore, at the timing when the focus operations for the left and right optical systems are finished, the shooting operation can be performed in the state where the shooting operation is synchronized between the left and right optical systems.

In Embodiment 1, it is notified that the focus operations have been finished by providing a display indicating the finish of the focus operations on the liquid crystal monitor 270. This disclosure is not limited to this. Namely, it may be notified that the focus operations have been finished by turning on or turning off an illumination element such as an LED or the like, or by generating a sound from a sound generation device such as a speaker or the like.

In Embodiment 1 described above, when an instruction to start a focus operation is issued, the controller 210 determines whether the search is to be started from the close position or from the infinite position in accordance with the position of the focus lens in the search range expanding from the wide angle end to the telephoto end. This disclosure is not limited to this. For example, it may be determined in advance whether the search is to be started from the close position or from the infinite position.

In Embodiment 1 described above, the AF auxiliary light of the illumination device 290 is turned off at one of the two timings when the focus operations are finished, which is later. This disclosure is not limited to this. The AF auxiliary light of the illumination device 290 may be turned off at one of the two timings when the focus determinations are finished, which is later. With this setting, the illumination device 290 can be turned off after the focus determinations for both eyes are finished with certainty. In this case, the power consumption can be reduced as compared with the case where the AF auxiliary light of the illumination device 290 is turned off at one of the two timings when the focus operations are finished, which is later.

In Embodiment 1 described above, the instruction to start shooting is provided by the user fully pressing the release button 250. However, this disclosure is not limited to this. For example, the controller 210 has a function of recognizing a smile of the person who is the subject. In the digital camera 100, the instruction to start shooting may be provided by the controller 210 upon recognizing a smile of the person who is the subject, instead of the user fully pressing the release button 250. As a result, in the case where a smile of the person who is the subject is recognized by the controller 210 before the focus operations for the optical systems for both eyes are finished, the shooting operation will be started at the timing when the focus operations for the optical systems for both eyes are finished. In the case where a smile of the person who is the subject is recognized by the controller 210 after the focus operations for the optical systems for both eyes are finished, the shooting operation will be started at the timing when the controller 210 recognizes the smile of the subject.

As described above, embodiments have been described as examples of the technology of this disclosure, and the attached drawings and the detailed description have been provided for the purpose of describing the embodiments.

Therefore, the elements shown and described in the attached drawings and the detailed description include elements which are necessary to solve the problems and also elements which are provided to illustrate the technology but are not necessary to solve the problems. Even though these unnecessary elements are shown and described in the attached drawings and the detailed description, it is not to be deemed that these unnecessary elements are necessary.

The above-described embodiments are for illustrating the technology of this disclosure, and therefore may be subjected to changes, replacements, additions or deletions in various manners within the claims or an equivalent range thereof.

This disclosure is not limited to being applied to the digital camera 100. That is, this disclosure is applicable to mobile devices such as digital video cameras, mobile phones with cameras, smart phones and the like which include twin lens optical systems.

What is claimed is:

1. An image capture device, comprising:
a first optical system including a first focus lens that moves along a first optical axis;
a second optical system including a second focus lens that moves along a second optical axis, the second optical axis being different from the first optical axis;
at least one image sensor that detects a subject image formed via the first optical system and the second optical system; and
a controller that moves the first focus lens and the second focus lens to perform focus control on each of the first optical system and the second optical system and that instructs the at least one image sensor to execute at least one shooting operation;
wherein the controller instructs the at least one image sensor to execute the at least one shooting operation at a first timing when the focus operation for the first optical system is finished or a second timing when the focus operation for the second optical system is finished, which is later.

2. The image capture device of claim 1, further comprising an operation section that accepts an instruction by a user to start shooting,
wherein in the case where the operation section accepts the instruction to start shooting before the focus operation for the first optical system and the focus operation for the second optical system are finished, the controller instructs the at least one image sensor to execute the at least one shooting operation at a first timing when the focus operation for the first optical system is finished or a second timing when the focus operation for the second optical system is finished, which is later.

3. The image capture device of claim 1, further comprising a notification section that indicates that the focus operation for the first optical system and the focus operation for the second optical system have been finished, at the first timing or the second timing which is later.

4. The image capture device of claim 1, further comprising an illumination device that emits auxiliary light for assisting the focus operation for the first optical system and the focus operation for the second optical system,
    wherein after turning on the illumination device, the controller turns off the illumination device at the first timing or the second timing which is later.

5. The image capture device of claim 1, wherein an angle of view of a first image obtained via the first optical system is different from an angle of view of a second image obtained via the second optical system.

6. The image capture device of claim 1, wherein the at least one image sensor includes a first image sensor and a second image sensor; and the first image sensor detects a first subject image formed via the first optical system, and the second image sensor detects a second subject image formed via the second optical system.

7. The image capture device of claim 1, wherein the at least one image sensor includes a first image area and a second image area; and the first optical system forms a first subject image on the first image area, and the second optical system forms a second subject image on the second image area.

8. An image capture device which allows a lens unit to be attached thereto or detached therefrom, the lens unit including a first optical system including a first focus lens that moves along a first optical axis, and a second optical system including a second focus lens that moves along a second optical axis, the second optical axis being different from the first optical axis;
    the image capture device comprising:
        at least one image sensor that detects a subject image formed via the first optical system and the second optical system; and
        a controller that moves the first focus lens and the second focus lens to perform focus control on each of the first optical system and the second optical system and that instructs the at least one image sensor to execute at least one shooting operation;
        wherein the controller instructs the at least one image sensor to execute the at least one shooting operation at a first timing when the focus operation for the first optical system is finished or a second timing when the focus operation for the second optical system is finished, which is later.

9. A controller that controls a lens unit including a first optical system including a first focus lens that moves along a first optical axis, a second optical system including a second focus lens that moves along a second optical axis, the second optical axis being different from the first optical axis, and at least one image sensor that detects a subject image formed via the first optical system and the second optical system;
    the controller comprising:
        a focus control section that moves the first focus lens and the second focus lens to perform focus control on each of the first optical system and the second optical system; and
        a shooting control section that instructs the at least one image sensor to execute at least one shooting operation;
        wherein the shooting control section instructs the at least one image sensor to execute the at least one shooting operation at a first timing when the focus operation for the first optical system is finished or a second timing when the focus operation for the second optical system is finished, which is later.

10. A computer program, stored on a non-transitory computer-readable medium, executable by a computer of an image capture device including a first optical system including a first focus lens that moves along a first optical axis, a second optical system including a second focus lens that moves along a second optical axis, the second optical axis being different from the first optical axis, and at least one image sensor that detects a subject image formed via the first optical system and the second optical system, the computer program causing the computer to execute the steps of:
    moving the first focus lens and the second focus lens to perform focus control on each of the first optical system and the second optical system; and
    causing the at least one image sensor to execute at least one shooting operation at a first timing when the focus operation for the first optical system is finished or a second timing when the focus operation for the second optical system is finished, which is later.

\* \* \* \* \*